United States Patent [19]

Sasaki et al.

[11] Patent Number: 4,697,470

[45] Date of Patent: Oct. 6, 1987

[54] POWER TRANSFER DEVICE FOR FOUR-WHEEL DRIVE

[75] Inventors: Kan Sasaki; Keisuke Takimura; Nobuaki Katayama, all of Toyota, Japan

[73] Assignee: Toyota Jidosha Kabushiki Kaisha, Toyota, Japan

[21] Appl. No.: 833,031

[22] Filed: Feb. 26, 1986

[30] Foreign Application Priority Data

Feb. 26, 1985 [JP] Japan .................. 60-026643[U]

[51] Int. Cl.$^4$ .................. F16H 37/08; F16H 1/44
[52] U.S. Cl. .................. 74/701; 74/710.5; 180/249
[58] Field of Search .................. 74/710.5, 701, 665 F; 180/248, 249, 250

[56] References Cited

U.S. PATENT DOCUMENTS

| | | | |
|---|---|---|---|
| 1,468,338 | 9/1923 | Wyman . | |
| 3,378,093 | 4/1968 | Hill .................. | 180/44 |
| 4,167,881 | 9/1979 | Bell et al. .................. | 74/710.5 |
| 4,459,874 | 7/1984 | Suzuki .................. | 74/745 |

FOREIGN PATENT DOCUMENTS

| | | | |
|---|---|---|---|
| 0043806 | 1/1982 | European Pat. Off. ............ | 180/249 |
| 0132238 | 1/1985 | European Pat. Off. ............ | 180/249 |
| 2350172 | 4/1974 | Fed. Rep. of Germany . | |
| 3311175A1 | 10/1984 | Fed. Rep. of Germany . | |
| 3318251A1 | 11/1984 | Fed. Rep. of Germany . | |
| 2280523 | 2/1976 | France . | |
| 2561180 | 9/1985 | France . | |
| 22325 | 11/1905 | United Kingdom . | |
| 2074516A | 11/1981 | United Kingdom . | |
| 2098148 | 11/1982 | United Kingdom .............. | 180/249 |
| 2133359A | 7/1984 | United Kingdom . | |
| 2133845A | 8/1984 | United Kingdom . | |

*Primary Examiner*—Leslie Braun
*Assistant Examiner*—D. Wright
*Attorney, Agent, or Firm*—Oblon, Fisher, Spivak, McClelland & Maier

[57] ABSTRACT

In combination with a power transmission, a power transfer device comprises a transfer casing detachably secured to a transmission casing, a first differential rotatable within the transmission casing and having a first gear casing driven by an output gear of the transmission, a second differential coaxial with the first differential having a second gear casing integral with an output element of the first differential and rotatable within the first gear casing, a carrier member rotatably mounted within the transfer casing and arranged coaxially with the first and second differentials, a first axle connected with an output element of the second differential and extending outwardly from the transmission casing, a second axle connected with another output element of the second differential and extending outwardly from the transfer casing through the carrier member, a hollow shaft in surrounding relationship with the second axle and connected at its opposite ends with another output element of the first differential and the carrier member, and a clutch sleeve slidably mounted on the hollow shaft to be engaged with the first gear casing. The clutch sleeve is arranged to be axially slidably coupled with the carrier member and to be positioned by engagement with the carrier member.

5 Claims, 5 Drawing Figures

POWER TRANSFER DEVICE FOR FOUR-WHEEL DRIVE

BACKGROUND OF THE INVENTION

1. Field of the Invention

The present invention relates to a power transmission for automotive vehicles, and more particularly to a power transfer device for four-wheel drive in combination with a power transmission.

2. Discussion of the Background

In copending U.S. patent application No. 795,862, filed on Nov. 5, 1985, now U.S. Pat. No. 4,645,029, there has been proposed a power transfer device for four-wheel drive in combination with a power transmission, which comprises a transfer casing detachably secured at one side thereof to a transmission casing, a first differential gear unit rotatably mounted within the transmission casing and having an input member in the form of a gear casing drivingly connected to an output gear of the transmission to split the driving power from the transmission into two torque delivery paths respectively for front-wheel drive and rear-wheel drive, a second differential gear unit arranged coaxially with the first differential gear unit and having an input member in the form of a gear casing integral with an output element of the first differential gear unit and rotatably mounted within the gear casing of the first differential gear unit, a carrier member rotatably mounted within the transfer casing and arranged coaxially with the first and second differential gear units, a first wheel axle drivingly connected to the inner end thereof with an output element of the second differential gear unit and extending outwardly from the transmission casing, a second wheel axle drivingly connected at the inner end thereof with another output element of the second differential gear unit and extending outwardly from the transfer casing through the carrier member, a hollow shaft arranged in surrounding relationship with the second wheel axle and having one end integral with another output element of the first differential gear unit and another end connected with the carrier member, and a clutch sleeve arranged between the first differential gear unit and the carrier member and axially slidably mounted on the hollow shaft by means of a spline connection to be selectively engaged with the input gear casing of the first differential gear unit.

During assembly process of the power transfer device, the first and second differential gear units are previously assembled within the transmission casing, while the carrier member and clutch sleeve are also previously assembled within the transfer casing. Thereafter, the transfer casing is fitted at its one end seating face to the transmission casing in such a manner that the carrier member and clutch sleeve are coupled over the hollow shaft. At this assembly step, it is difficult to carry the clutch sleeve in place for coupling over the hollow shaft, and it is also difficult to position the clutch sleeve for eliminating phase shift between the internal splines of the clutch sleeve and the external splines of the hollow shaft, if any. For this reason, if there is phase shift between the internal splines of the clutch sleeve and the external splines of the hollow shaft at the assembly step, it will be disable to couple the clutch sleeve over the hollow shaft. In such a situation, the transfer casing must be moved to effect coupling of the clutch sleeve with the hollow shaft.

SUMMARY OF THE INVENTION

It is, therefore, a primary object of the present invention to provide an improved power transfer device capable of carrying the clutch sleeve in place for coupling over the hollow shaft at the assembly step described above and of positioning the clutch sleeve in a simple manner.

According to the present invention, the primary object is accomplished by providing a power transfer device wherein the clutch sleeve is arranged to be axially slidably coupled with the carrier member and to be positioned by engagement with the carrier member in a circumferential direction. In a preferred embodiment of the present invention, the carrier member is formed at one end thereof with an internal annular recess concentric with the hollow shaft and provided with an axial pin secured thereto and located within the internal annular recess, while the clutch sleeve is formed with a cylindrical portion to be coupled within the internal annular recess of the carrier member and a radial recess to be engaged with the axial pin of the carrier member. In this arrangement, the clutch sleeve is previously coupled within the internal annular recess of the carrier member at its cylindrical portion and engaged with the axial pin of the carrier member at its radial recess. Thus, the carrier member and clutch sleeve can be coupled over the hollow shaft in a simple manner and splined to the same. Even if there is phase shift between the internal splines of the carrier member and clutch sleeve and the external splines of the hollow shaft, the carrier member and clutch sleeve will be smoothly coupled over the hollow shaft because the carrier member and clutch sleeve can be rotated from the exterior of the transfer casing.

BRIEF DESCRIPTION OF THE DRAWINGS

Additional objects, features and advantages of the present invention will become readily apparent from the following detailed description of a preferred embodiment thereof when taken together with the accompanying drawings, in which.

DESCRIPTION OF THE PREFERRED EMBODIMENT

Figure 1:
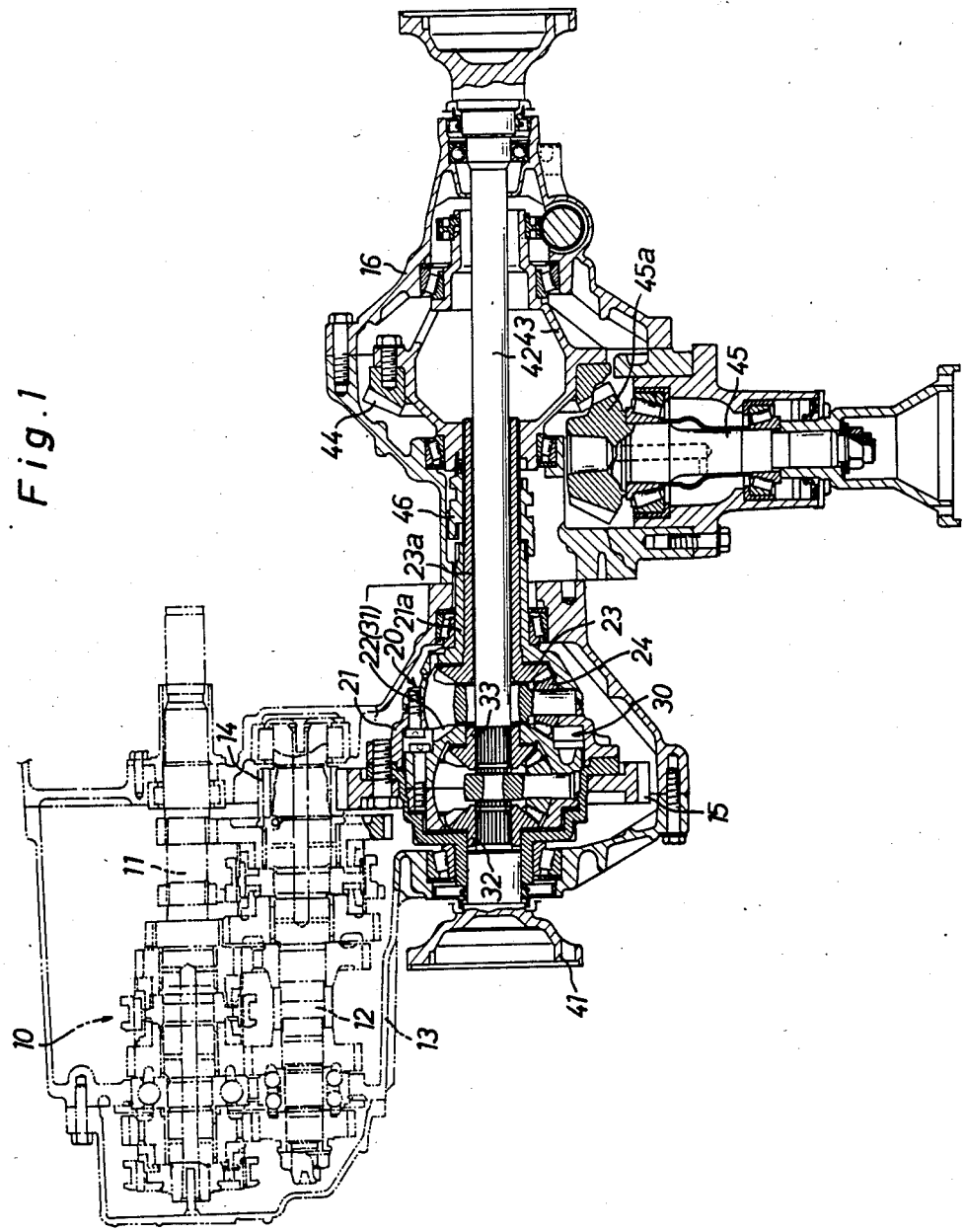
FIG. 1 is a sectional view of a power transfer device for four-wheel drive in combination with a power transmission.

Referring now to the drawings, FIG. 1 illustrates a power transfer device in accordance with the present invention which is adapted to a power transmission 10 for an automotive vehicle of the front-engine front-wheel drive type. The power transmission 10 is fixedly mounted to one side of an internal combustion engine (not shown) through a clutch mechanism (not shown) in a usual manner. The engine is arranged within a front engine room of the vehicle in such a manner that a crankshaft of the engine is transversely placed. The power transmission 10 includes a transmission casing 13 secured at one side thereof to a cylinder block of the engine, an input shaft 11 rotatably mounted within the transmission casing 13 and arranged coaxially with the crankshaft of the engine, an output shaft 12 rotatably mounted within the transmission casing 13 and arranged in parallel with the input shaft 11, a change-speed gearing mounted on the input and output shafts 11 and 12, and a final drive gearing including a ring gear 15 permanently in mesh with an output gear 14 mounted on the output shaft 12 for rotation therewith.

The power transfer device comprises a first differential gear unit 20 of the bevel gear type arranged to split the driving power from the power trannsmission 10 into two torque delivery paths for front-wheel drive and rear-wheel drive, and a second differential gear unit 30 of the bevel gear type for front-wheel drive coaxially arranged with the first differential gear unit 20. The first differential gear unit 20 includes an input member in the form of a gear casing 21 positioned within the transmission casing 13 and rotatably supported by a pair of axially spaced bearings carried on the transmission casing 13, a pair of side gears 22 and 23 rotatably mounted within the gear casing 21, and a pinion 24 rotatably carried on the gear casing 21 by means of a cross shaft and in mesh with the side gears 22 and 23. The gear casing 21 carries thereon the ring gear 15 for rotation therewith and is integrally formed with a hollow shaft portion 21a which extends outwardly from the transmission casing 13. The side gear 23 is integrally formed with a hollow shaft 23a which is rotatably supported by the hollow shaft portion 21a of gear casing 21 and extends outwardly from the transmission casing 13.

The second differential gear unit 30 is rotatably mounted within the gear casing 21 of first differential gear unit 20. The second differential gear unit 30 includes an inner gear casing 31 integral with the side gear 22 of first differential gear unit 20, a pair of side gears 32 and 33 rotatably mounted within the inner gear casing 31, and a pinion 34 rotatably carried on the inner gear casing 31 by means of a cross shaft and in mesh with the side gears 32 and 33. The side gear 32 is rotatably carried on the gear casing 21 and splined to the inner end of a left-hand front-wheel axle 41 which extends outwardly from the transmission casing 13 in a liquid-tight manner. The side gear 33 is rotatably carried on the inner gear casing 31 and splined to the inner end of a right-hand front-wheel axle 42 which extends outwardly through the hollow shaft 23a.

The power transfer device further comprises a transfer casing 16 which is detachably secured in a liquid-tight manner at its left end seating face to the right end seating face of transmission casing 13 to contain therein the hollow shaft portion 21a of gear casing 21 and the hollow shaft 23a integral with side gear 23. Assembled within the transfer casing 16 is a carrier member 43 which is arranged coaxially with the first and second differential gear units 20 and 30 and in surrounding relationship with the right-hand front-wheel axle 42. The carrier member 43 is rotatably supported by a pair of axially spaced bearings carried on the transfer casing 16 and is splined to the right end of hollow shaft 23a for rotation therewith. A second ring gear 44 is fixedly mounted on the carrier member 43 for rotation therewith and permanently in mesh with a drive pinion 45a of a pinion shaft 45 which is rotatably mounted within the transfer casing 16 by means of a pair of axially spaced bearings in a fore-and-aft direction of the vehicle. The pinion shaft 45 is drivingly connected in a usual manner to rear-wheel axles (not shown) by way of a propeller shaft and a final drive gearing for rear-wheel drive (not shown).

Figure 2:
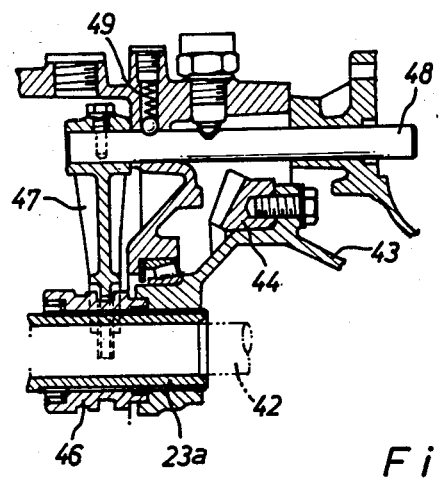
FIG. 2 is an enlarged sectional view illustrating a shift mechanism of the power transfer device shown in FIG. 1.

Arranged between the first differential gear unit 20 and the carrier member 43 is a clutch sleeve 46 which is axially slidably mounted on the hollow shaft 23a by means of a spline connection. The hollow shaft portion 21a of gear casing 21 is formed at its right end with external splines, and the clutch sleeve 46 is formed at its left end with an internally splined bore engageable with the external splines of hollow shaft portion 21a of gear casing 21. As shown in FIG. 2, the clutch sleeve 46 is carried by a shift fork 47 which is fixed at its base end to a manually operated shift rod 48. The shift rod 48 is arranged in parallel with the hollow shaft 23a and axially slidably mounted on a pair of axially spaced inner walls of transfer casing 16 to be retained in a selected position by means of a detent mechanism 49. When the shift rod 48 is positioned to retain the clutch sleeve 46 in a first position as is illustrated by an upper half in FIG. 1, the clutch sleeve 46 is disengaged from the hollow shaft portion 21a of gear casing 21 to permit relative rotation between the side gears 22 and 23 thereby to make the first differential gear unit 20 operative. When the shift rod 48 is shifted to move the clutch sleeve 46 to a second position as is illustrated by a lower half in FIG. 1, the clutch sleeve 46 is engaged with the hollow shaft portion 21a of gear casing 21 to disable relative rotation between the side gears 22 and 23 thereby to lock the first differential gear unit 20.

In operation, the driving power of the engine is applied to the input shaft 11 of power transmission 10 through the associated clutch device and transmitted at a selected gear ratio to the output shaft 12 by way of the change-speed gearing. Thus, the driving power from output shaft 12 is applied to the gear casing 21 of first differential gear unit 20 by way of the ring gear 15. Assuming that the clutch sleeve 46 is disengaged from the hollow shaft portion 21a of gear casing 21 in the first position, the first differential gear unit 20 operates to split the driving power into two torque delivery paths toward the side gears 22 and 23. The driving torque from side gear 22 is applied to the second differential gear unit 30 for front-wheel drive and finally transmitted to the left and right front-wheel axles 41 and 42 through side gears 32 and 33 of the gear unit 30. On the other hand, the driving torque from side gear 23 is applied to the carrier member 43 through hollow shaft 23a and transmitted to the pinion shaft 45 by way of the ring gear 44 and pinion 45a to drive the rear-wheel axles by way of the propeller shaft and the final drive gearing for rear-wheel drive. When the clutch sleeve 46 is moved to the second position and retained in engagement with the hollow shaft portion 21a of gear casing 21, the first differential gear unit 20 is locked to disable relative rotation of the side gears 22 and 23. Thus, the second differential gear unit 30 for front-wheel drive and the carrier member 43 for rear-wheel drive are applied with the same driving torque respectively through the side gears 22 and 23 of first differential gear unit 20.

Figure 3:
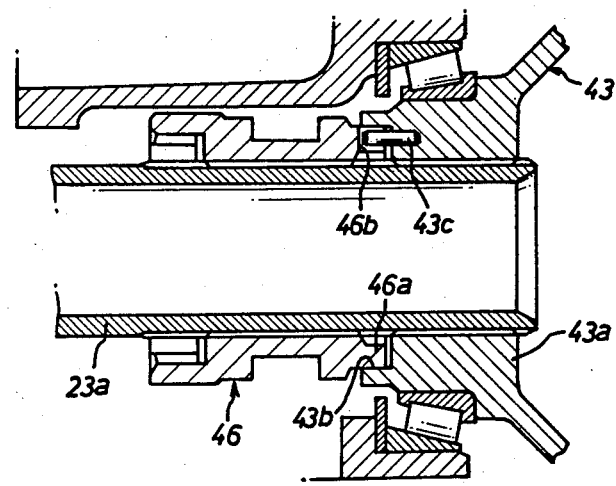
FIG. 3 is an enlarged sectional view illustrating an arrangement of a clutch sleeve in the power transfer device shown in FIG. 1.
Figure 4:
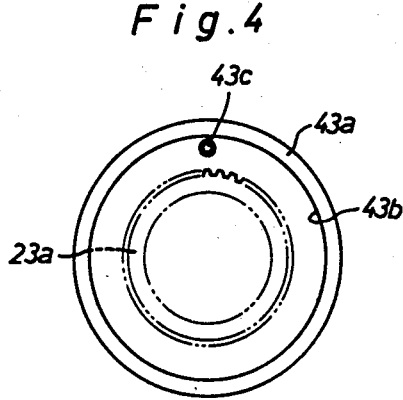
FIG. 4 is an end view of a carrier member shown in FIG. 3.
Figure 5:
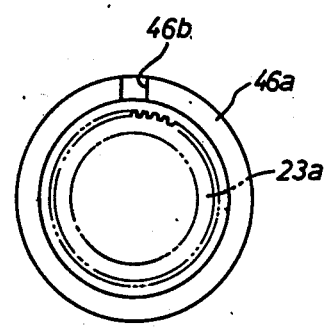
FIG. 5 an end view of the clutch sleeve shown in FIG. 3.

In this embodiment, as shown in FIGS. 3-5, the carrier member 43 is formed at its left end 43a with an internal annular recess 43b arranged to be concentric with the hollow shaft 23a. The clutch sleeve 46 is formed at its right end with a cylindrical portion 46a which is axially slidably coupled within the internal annular recess 43b of carrier member 43 such that the clutch sleeve 46 is positioned in relative to the carrier member 43 in a radial direction. The carrier member 43 is further provided with an axial pin 43c secured thereto, and located within the internal annular recess 43b, while the clutch sleeve 46 is further formed at its right end with a radial recess 46b which is axially slidably engaged with the axial pin 43c of carrier member 43 such that the clutch sleeve 46 is positioned in relative to the carrier member 43 in a circumferential direction.

During assembly process of the power transfer device, the first and second differential gear units 20 and 30 are previously assembled within the transmission casing 13, while the carrier member 43, ring gear 44, drive pinion shaft 45, clutch sleeve 46 and shift fork 47 are also previously assembled within the transfer casing 16. Thereafter, the transfer casing 16 is fitted at its left end seating face to the right end seating face of the transmission casing 13 in such a manner that the carrier member 43 and clutch sleeve 46 are coupled over the hollow shaft 23a integral with side gear 23 of first differential gear unit 20. At this assembly step, the clutch sleeve 46 is previously coupled within the internal annular recess 43b of carrier member 43 at its cylindrical portion 46a and engaged with the axial pin 43c of carrier member 43 at its radial recess 46b. The clutch sleeve 46 is further carried by the shift fork 47 in place to maintain engagement with the carrier member 43. Thus, the carrier member 43 and clutch sleeve 46 can be coupled over the hollow shaft 23a in a simple manner and splined to the same without any difficulty. Even if there is phase shift between the internal splines of carrier member 43 and clutch sleeve 46 and the external splines of hollow shaft 23a, the carrier member 43 and clutch sleeve 46 will be smoothly coupled over the hollow shaft 23a because the carrier member 43 and clutch sleeve 46 can be rotated by operation of the pinion shaft 45 to eliminate the phase shift.

Although in the above-described embodiment the power transfer device of the present invention is adapted to an automotive vehicle of the front-engine four-wheel drive type, it may be adapted to an automotive vehicle of the rear-engine four-wheel drive type. In such case, the second differential gear unit 30 for front-wheel drive is replaced with a differential gear unit for rear-wheel drive, the ring gear 44 for rear-wheel drive is replaced with a ring gear for front-wheel drive, and the transfer casing 16 is located at the front of the engine or below the engine.

Having now fully set forth the structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power transfer device for four-wheel drive in combination with a power transmission having a transmission casing, an input shaft rotatably mounted within said transmission casing, an output shaft rotatably mounted within said transmission casing in parallel with said input shaft, a change-speed gearing mounted on said input and output shafts, and an output gear mounted on said output shaft for rotation therewith, the power trasnfer device comprising:

a transfer casing detachably secured at one side thereof to said transmission casing;

a first differential gear unit arranged within said transmission casing and including an input element in the form of a first gear casing rotatably mounted within said transmission casing and drivingly connected to said output gear, and a air of first output elements rotatably mounted within said first gear casing respectively for front-wheel drive and rear-wheel drive;

a second differential gear unit arranged coaxially with said first differential gear unit and including a second input member in the form of a second gear casing integral with one of said first output elements and rotatably mounted within said first gear casing, and a pair of second output elements rotatably mounted within said second gear casing;

a carrier member rotatably mounted within said transfer casing and arranged coaxially with said first and second differential gear units;

a first wheel axle drivingly connected at an inner end thereof with one of asid second output elements and extending outwardly from said transmission casing;

a second wheel axle drivingly connected at an inner end thereof with the other second output element of said second differential gear unit and extending outwardly from said transfer casing through said carrier member;

a hollow shaft arranged in surrounding relationship with said second wheel axle and having one end integral with the other first output element of said first differential gear unit and another end connected with said carrier member for rotation therewith; and a clutch sleeve arranged between said first differential gear unit and said carrier member and axially slidably mounted on said hollow shaft for rotation therewith and being shiftable between a first position where it is disengaged from said first gear casing and a second position where it is engaged at one end thereof with said first gear casing;

an output gearing assembled within said transfer casing and arranged to be driven by said carrier member; and means for axially slidably coupling an end of said clutch sleeve with one end of said carrier member in such a manner that said clutch sleeve is positioned relative to said carrier member in a predetermined radial and circumferential direction.

2. A power transfer device for four-wheel drive in combination with a power transmission having a transmission casing, an input shaft rotatably mounted within said transmission casing, an output shaft rotatably mounted within said transmission casing in parallel with said input shaft, a change-speed gearing mounted on said input and output shafts, and an output gear mounted on said output shaft for rotation therewith, the power transfer device comprising:

a transfer casing detachably secured at one side thereof to said transmission casing;

a first differential gear unit arranged within said transmission casing and including an input element in the form of a first gear casing rotatably mounted within said transmission casing and drivingly connected to said output gear, and a pair of first output elements rotatably mounted within said first gear casing respectively for front-wheel drive and rear-wheel drive;

a second differential gear unit arranged coaxially with said first differential gear unit and including a second input member in the form of a second gear casing integral with one of said first output elements and rotatably mounted within asid first gear casing, and a pair of second output elements rotatably mounted within said second gear casing;

a carrier member rotatably mounted within said transfer casing and arranged coaxially with said first and second differential gear units;

a first wheel axle drivingly connected at an inner end thereof with one of said second output elements and extending outwardly from said transmission casing;

a second wheel axle drivingly connected at an inner end thereof with the other second output element of said second differential gear unit and extending outwardly from said transfer casing through said carrier member;

a hollow shaft arranged in surrounding relationship with said second wheel axle and having one end integral with the other first output element of said first differential gear unit and another end connected with said carrier member for rotation therewith; and a clutch sleeve arranged between said first differential gear unit and said carrier member and axially slidably mounted on said hollow shaft for rotation therewith and being shiftable between a first position where it is disengaged from said first gear casing and a second position where it is engaged at one end thereof with said first gear casing; and an output bearing assembled within said transfer casing and arranged to be driven by said carrier member;

wherin said carrier member is formed at one end thereof with an internal annular recess concentric with said hollow shaft and provided with an axial pin secured thereto and located within said internal annular recess, and wherein said clutch sleeve is formed at another end thereof with a cylindrical portion to be axially slidably coupled within said internal annular recess of said carrier member in such a manner that said clutch sleeve is positioned relative to said carrier member in a predetermined radial direction and is further formed with a radial recess to be axially slidably engaged with said axial pin of said carrier member in such a manner that said clutch sleeve is positioned relative to said carrier member in a predetermined circumferential direction.

3. A power transfer device as claimed in claim 2, wherein said first gear casing of said first differential gear unit is integrally formed with a hollow shaft portion which is arranged in surrounding relationship with said hollow shaft and formed thereon with external splines, and wherein said clutch sleeve is formed at its one end with an internally splined bore engageable with the external splines of said hollow shaft portion.

4. A power transfer device as claimed in claim 1, wherein said output gearing includes a ring gear integral with said carrier member, and a pinion integral with a pinion shaft rotatably mounted within said transfer casing in a fore-and-aft direction of the vehicle, said pinion being permanently in mesh with said ring gear.

5. A power transfer device as claimed in claim 2, wherein said second differential gear unit is arranged to provide a front-wheel drive, and said output gearing is arranged to provide a rear-wheel drive.

* * * * *